United States Patent [19]

Morales

[11] Patent Number: 5,392,353
[45] Date of Patent: Feb. 21, 1995

[54] INTERACTIVE SATELLITE BROADCAST NETWORK

[75] Inventor: Fernando Morales, Reston, Va.

[73] Assignee: TV Answer, Inc., Reston, Va.

[21] Appl. No.: 932,241

[22] Filed: Aug. 19, 1992

Related U.S. Application Data

[63] Continuation-in-part of Ser. No. 879,984, May 8, 1992, continuation-in-part of Ser. No. 674,169, Mar. 25, 1991, which is a continuation-in-part of Ser. No. 390,073, Aug. 7, 1989, Pat. No. 5,101,267.

[51] Int. Cl.$^6$ .............................................. H04L 9/16
[52] U.S. Cl. ........................................ 380/20; 380/25
[58] Field of Search .................... 380/20, 21, 25, 30

[56] References Cited

U.S. PATENT DOCUMENTS

| | | | |
|---|---|---|---|
| 3,668,307 | 6/1972 | Face et al. .............................. | 380/20 |
| 4,323,921 | 4/1982 | Guillou .................................. | 380/20 |
| 4,418,425 | 11/1983 | Fennel, Jr. et al. ..................... | 380/33 |
| 4,438,824 | 2/1984 | Mueller-Schloer .................... | 380/21 |
| 4,458,109 | 7/1984 | Mueller-Schloer .................... | 380/21 |
| 4,531,020 | 7/1985 | Wechselberger et al. ............. | 380/21 |
| 4,591,906 | 5/1986 | Morales-Garza et al. . | |
| 4,613,901 | 9/1986 | Gilhousen et al. ..................... | 380/20 |
| 4,694,491 | 9/1987 | Horne et al. ........................... | 380/20 |
| 4,720,850 | 1/1988 | Oberlander et al. . | |
| 4,736,423 | 4/1988 | Matyas .................................. | 380/25 |
| 4,751,732 | 6/1988 | Kamitake ............................... | 380/20 |
| 4,887,296 | 12/1989 | Horne .................................... | 380/21 |
| 4,888,801 | 12/1989 | Foster et al. ........................... | 380/25 |
| 4,937,866 | 6/1990 | Crowther et al. ...................... | 380/20 |
| 4,972,479 | 11/1990 | Tobias, Jr. et al. ..................... | 380/33 |
| 4,980,677 | 12/1990 | Hotta et al. . | |
| 5,027,400 | 6/1991 | Baji et al. ............................... | 380/20 |
| 5,048,085 | 9/1991 | Abraham et al. ...................... | 380/25 |
| 5,291,554 | 3/1994 | Morales .................................. | 380/23 |
| 5,307,411 | 4/1994 | Anvret et al. .......................... | 380/25 |
| 5,343,527 | 8/1994 | Moore .................................... | 380/30 |

*Primary Examiner*—Salvatore Cangialosi
*Attorney, Agent, or Firm*—Laurence R. Brown

[57] ABSTRACT

Encrypted communications ensure privacy of communications point-to-point in a network of interactive video stations interconnected by a broadcast network. The encryption as a function of personal identity keys uniquely assigned to each station protects private communications both incoming and outgoing. Thus, a central facility having the only directory of the personal identity keys intercepts encrypted communications for reformatting and encrypting to redirect to a designated target station in the network. The keys are thus secured, and the broadcast communications are not readily analyzed for deriving sensitive data, or the communicating parties. In this manner financial transactions such as electronic payment from banks authorized in private communications with vendor stations are subject to intrusion and/or fraud.

12 Claims, 3 Drawing Sheets

INTERACTIVE SATELLITE BROADCAST NETWORK

This application is a continuation-in-part of the copending application Ser. No. 07/879,984, filed May 8, 1992, for INTERACTIVE TWO-WAY VIDEO COMMUNICATION AND BILLING SYSTEM, now pending, which in turn is a continuation-in-part of Ser. No. 07/674,169, filed Mar. 25, 1991, for CUSTOMIZED INTERACTIVE TELEVISION SYSTEM, now pending, which is a continuation-in-part of Ser. No. 07/390,073, filed Aug. 7, 1989, for WIDE AREA REAL-TIME T-V AUDIENCE POLLING SYSTEM WITH LOCAL AREA STATIONS LINKED BY SATELLITE, now U.S. Pat. No. 5,101,267, issued Mar. 31, 1992.

TECHNICAL FIELD

This invention relates to an interactive satellite broadcast network for coupling participating service stations with a system of user stations each having a computer with a standard television receiver video display, and more particularly it relates to interactive ordering and billing broadcast systems providing two-way point-to-point communications in the network with protection of the privacy of communications and financial transactions.

BACKGROUND ART

It is known in the art to scramble broadcast messages for communication privacy. For example, R. W. Tobias, Jr. in U.S. Pat. No. 4,972,479, Nov. 20, 1990 provides a cellular telephone system with scrambled broadcast messages between mobile units and telephone company cell sites wherein the telephone company descrambles the broadcast communications for wire communication to a called party station thereby avoid descrambling equipment at all of the called party stations. Security is limited because of the several system locations at which descrambling keys are available and because of relatively unsecured communications in the telephone switching system serving the called party. Thus, there is no feasible way to secure many people at many locations so that it is not reasonably possible to intercept private communications. Nor is this system feasible for eliminating the possibility of theft and fraud in two-way systems accommodating interactive purchasing transactions including payment from credit cards, deposits or bank accounts.

In a Satellite Business Communication System set forth by T. Hotta, et al. in U.S. Pat. No. 4,980,677 issued Dec. 25, 1990, a public telephone system links an operator manned central control supervising station and terminal stations coupled in a satellite network. Thus, privacy is not practically securable in a way that prevents fraud by outside parties who may intercept messages or intrude into the system.

In prior subscription television systems, encryption techniques are used for message protection, for example to assure pay for viewing as a condition for descrambling. Such systems are exemplified by U.S. Pat. Nos. to K. S. Gilhousen, et al., 4,613,901, Sep. 23, 1986 for a Signal Encryption and Distribution System; G. O. Crowther, et al., 4,937,866, Jun. 26, 1990 for a System of Decoding Transmitted Scrambled Signals; and T. Kamitake, 4,751,732, Jun. 14, 1988 for a Broadcasting System sending programs to subscribers via satellite. Even though scrambling and access keys are used in these systems, they are all relatively easy to intrude and obtain access by counterfeiting coded cards or otherwise obtaining the decoding key from the broadcast information such as by computer analysis of broadcast signals.

The prior art systems do not provide an acceptable degree of security that communications are protected without the danger of intrusion and fraud. This is particularly so in systems in which purchase transactions are broadcast over a satellite network for purchasing services or goods interactively with incorporated payment transactions, which require access codes to specified bank funds, deposits or credit cards.

Furthermore the prior art interactive purchasing systems process information that may be private, such as subscriber identification numbers and customer lists, without adequate security safeguards against intrusion and fraud. For example, poorly secured customer and vendor identification lists, and private key codes may become accessible for intrusion or fraud.

It is therefore a general objective of this invention to produce a secure interactive satellite broadcast system for protecting privacy.

It is a more specific objective of the invention to produce point-to-point communications broadcast via satellite without identifying messages, participants, transactions, or payment sources.

DISCLOSURE OF THE INVENTION

This invention provides improved privacy of communicated messages and participants in a two-way, wireless, satellite broadcast network for processing interactive payment transactions between subscribers and vendors. Thus, each participating station has encryption and decryption equipment for communicating via individually secured point-to-point transactions encrypted as a function of personal identification keys (PIK) known only by the individual participating stations and a secure single central switching control center with a directory and facilities for identifying the personal identification coding keys of all network stations and for directing point-to-point communications uniquely to a designated recipient.

Thus, the network control center intercepts communications encrypted as a function of the sender's personal identification key, and relays incoming communications designating the receiver in encrypted format as a function of the receiver's personal identification key (PIK). The control center maintains the sole PIK directory securely to further protect private messages from intrusion and to protect the identity of the communicants.

The foregoing parent applications are incorporated herein by reference in their entirety as background information.

BRIEF DESCRIPTION OF THE DRAWINGS

In the accompanying drawings, wherein like reference characters refer to similar features throughout the several views.

THE PREFERRED EMBODIMENT

Figure 1:
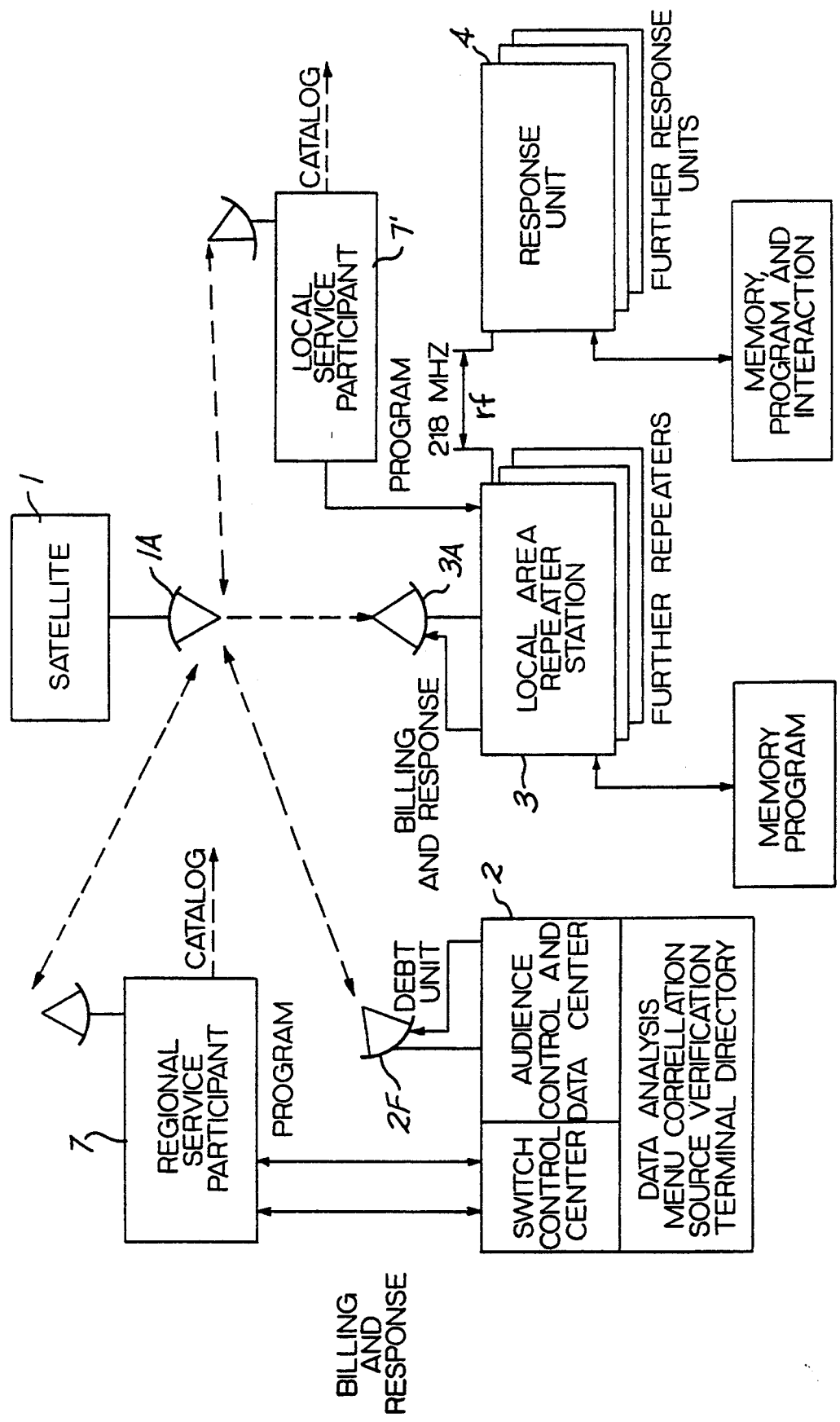
FIG. 1 is a block system diagram of the secure point-to-point communication system of this invention.
Figure 2:
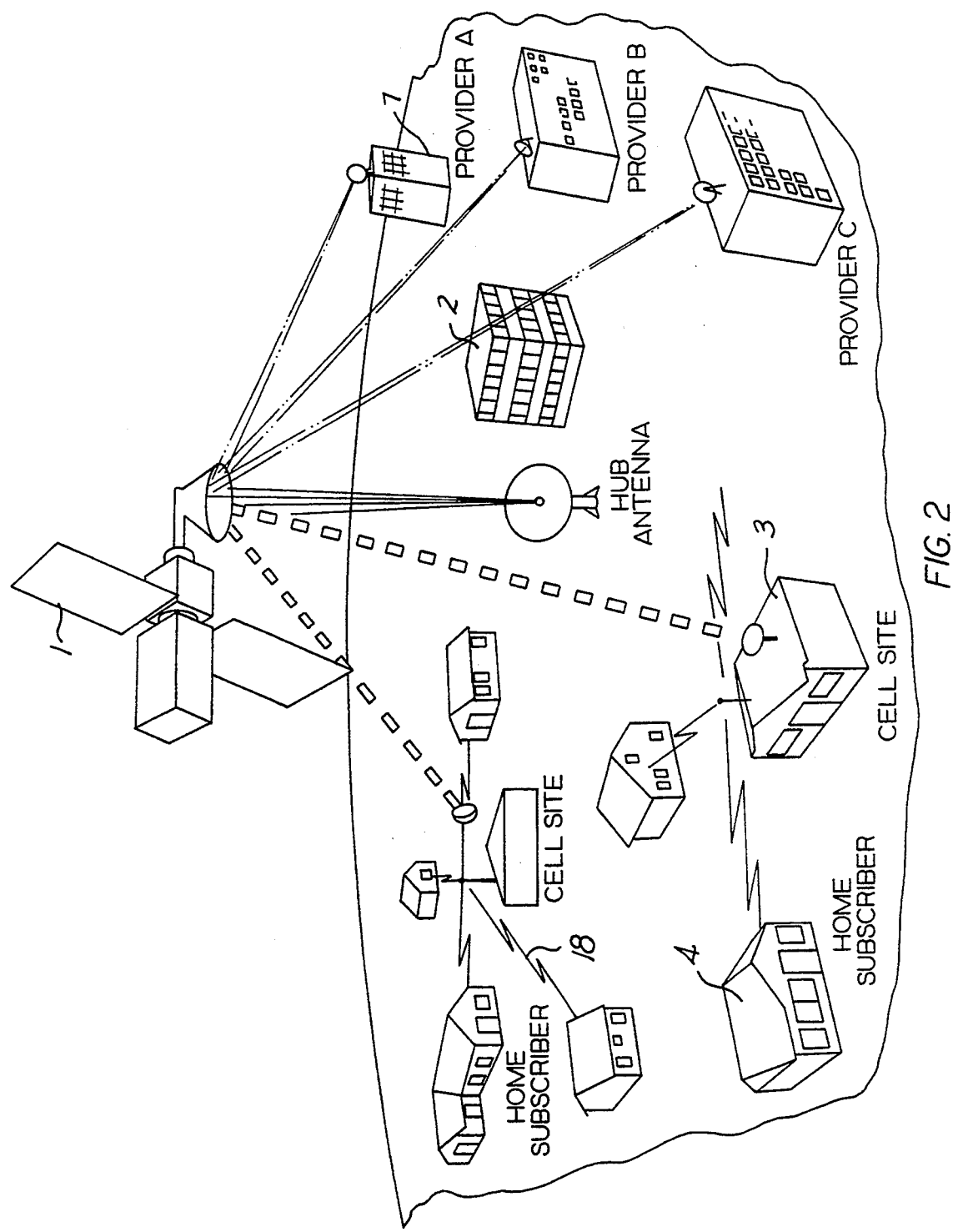
FIG. 2 is a diagrammatic view illustrating the general satellite broadcast network over which the private point-to-point communications are processed in accordance with the invention.

Nationwide two-way interactive video subscriber stations 4, with preferred embodiments shown in FIGS. 1 and 2, communicate point-to-point by way of the satellite 1 with other subscriber stations or with service providers 7 in real time employing the technology of the aforesaid U.S. Pat. No. 5,101,257. The system is switched, monitored and controlled by the data control center 2, which maintains a terminal directory of all network station identification codes for point-to-point call direction and associated PIK codes for processing private communications. The data control center 2, thus intercepts all outgoing interactive messages broadcast over local link (18, FIG. 3) and the wide area satellite system 1, and reforms these interactive messages for transmission to a designated reception station (7) in point-to-point communication.

The system of FIGS. 1 and 2, when incorporating the features of U.S. Pat. No. 4,591,906, F. Morales-Garza, et al., May 27, 1986 can identify each subscriber in a time multiplex type of communication synchronized with television signals, but is operable in different modes to provide two way broadcast interactive signals. It is characterized by an auxiliary wireless transmission channel (FIG. 3) for conveying messages supplemental to programmed signals, typically television pictures. Thus, a versatile two-way wireless real time video communication system is provided ideally suited for interactive dealings with vendors of goods and services, including for example banks (either directly or for implicit purchase payment transactions), stockbrokers, data sources, movie banks, and the like.

In these transactions there can be considerable need for privacy and security of both communications and of the communicators. For example, interactive banking transactions where account information or access codes are broadcast over a satellite network, even when encrypted, could induce interception for computer analysis and decrypting to determine secret information such as bank balances, access codes, and business transactions. In this respect the present invention provides a more secure system that protects the secrecy of both communications and communicators by way of the function of the data control center 2 and the particular processing procedure of encrypted communications herein set forth.

The control center 2 thus intercepts and processes interactive communications between all network stations including those of the subscribers 4 and of the commercial service participants 7. In the parent application Ser. No. 07/879,984, the point-to-point communication system is discussed in greater detail. There, the role of the sole directory (22, 23, FIG. 3) at the control center 2 in addressing the network stations (4, 7) individually by receiving communications from a sending station and reformatting for point-to-point direction to a designated receiving station, is set forth with more particularity. Thus, the central data station-(2) receives from a subscriber sender (4) a communication that is reformatted and addressed to the designated receiver, typically service station 7. Neither sender, receiver or the public with access to the broadcast data from the satellite 1 need to know the access code addresses of the stations within the network. Each station is provided with signal selection, encrypting and decrypting equipment for isolating coded messages restricted to private use of that station.

If the communications are from a purchaser 4 to a vendor 7, they may implicitly include payment authorization of the purchaser via credit card, deposit account, or banking transaction in a manner known and stored in the communications equipment 20 at the control center. It is evident that such information is private and sensitive information which could be abused by intruders and the opportunity for fraud if not very carefully protected and restricted in access. The conventional manner of encrypting the communications is not safe enough to protect secrecy, since intercepted communications may be subjected to thorough computer analysis over long periods of time for decrypting conventional scrambled and coded network communications.

Figure 3:
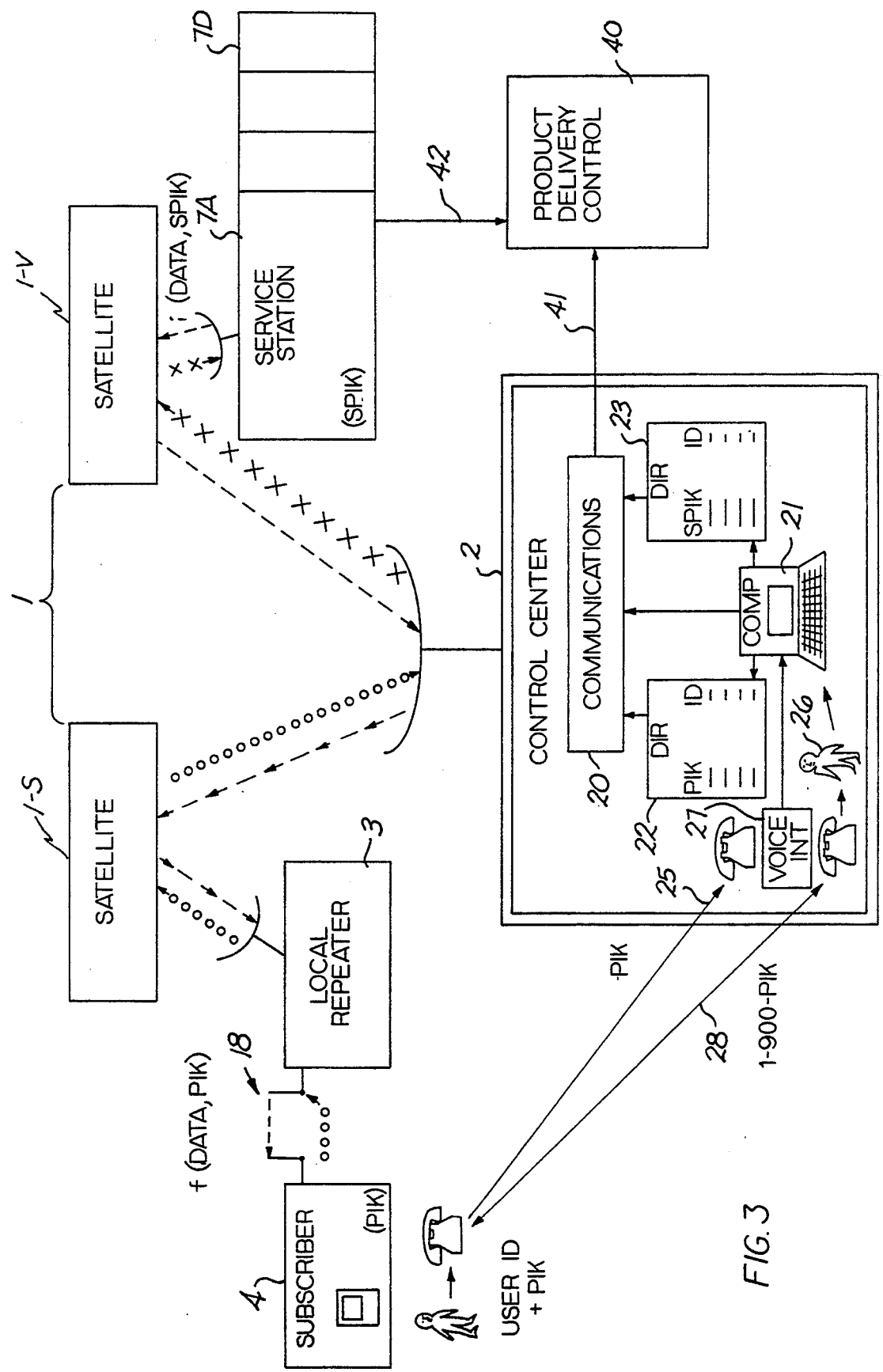
FIG. 3 is a diagrammatic view illustrating the private point-to-point communicating procedure afforded by this invention.

Accordingly a preferred embodiment of the data processing procedure for more secure secrecy of both communications and communicators is configured in FIG. 3. Improved privacy of communicated messages and communicators 4, 7A is provided in the two-way, wireless, broadcast network for processing interactive payment transactions between subscribers 4 and vendors 7A over the satellite system 1. Each participating station 4, 7A has encryption and decryption equipment for processing private communications over the satellite wireless network for point-to-point transactions such as ordering a pay-per-view program or making a purchase of goods or services.

For protection of the security of this system, data transmissions to and from individual stations are encrypted as a function of personal identification keys (PIK & SPIK) known only by the individual participating stations and the secured single central switching control center 2. (Security is indicated by the double lined block designation.) Appropriate precautions are taken for clearance of the very few personnel involved at control center 2, and the premises are electronically secured to prevent electronic eavesdropping from outside the center.

Appropriately programmed PIK encryption-decryption equipment together with access to the secret PIK are necessary for receiving and sending secret messages broadcast over the satellite system 1. Different programs can be downloaded from the control center frequently to change encryption procedures and thus further improve security. Thus, the subscriber 4 or properly programmed subscriber equipment to send a private communication must enter the PIK as part of the communication, thus enabling the control center 2 to receive a broadcast signal compare with directory charts 22, 23 and retransmit a newly formatted and encrypted communication as a function of the service station personal identification key (SPIK) thereby enabling the destination service station 7A to receive and decrypt the communication. Similarly the service station 7A must enter the SPIK for sending out a communication for completing a transaction. The outgoing private communications from subscriber 4 to the control center 2 thus are designated by lines bearing the circle notation for indicating outgoing PIK encryption, and those private messages outgoing from the service station 7A have the dash notation for indicating the SPIK encryption. Similarly, when the data center 2 retransmits the subscriber communications to the designated service station point (7A) the recoding into the appropriate SPIK encrypted format carrying the x notation. Conversely the service station 7A communications are reformatted to PIK as noted by the arrow notation toward the subscriber 4.

Accordingly in the control center 2, the control computer 21 processes, encrypts and formats communications at 20. The respective PIK and SPIK registers 22, 23 are maintained solely at the control center 2 under appropriate secured conditions, as aforesaid. For a subscriber 4 to have access to the control center on telephone link 25, the PIK code is used by the subscriber. Then local operator 26 typically can make voice communication at the interrupt block 27 and after the interruption, typically connect the subscriber and telephone directly for entry of a code input number, as desired.

As a part of the security system, the subscriber can change the PIK by way of access telephone link 28, paying for costs by way of a "900" call. This can be done whenever any unauthorized person obtains the PIK, such as a child in the household who is not to have access to automated payment for services or goods interactively ordered over the system. The operator 26 then processes computer 21 to remove the old PIK and or the user identification number ID and enter the new listing. Thus the directories 22, 23 are able to complete by the identification numbers ID, unclassified communications from point-to-point in the network, and to handle the special key encrypted secret messages with the associated PIK. The operator 26 intervenes to simplify the procedure for the subscriber by oral communication regarding the entry procedure as needed. For higher security, the operator 26 can be isolated from access via computer keyboard 29 to the PIK or SPIK tables and access for completing the connection is automated by appropriate software in the communication section 20.

In a typical procedure, a communication to a service station (7) will be formatted and encrypted at the sending station (4) to include interactively entered data, the sending station PIK, the time, the payment instructions, and a designated destination. The time signal in view of the real-time interactive response of this system will e.g. in response to an advertising menu displayed on a television program itself implicitly identify a designated service station as reflected on control center records. Similarly a catalog code number for a purchase or a banking mode local operating condition can identify a bank and its access code, all without requiring knowledge of the secret SPIK, which is supplied at the control center in reformatting the communication for private delivery to the designated addressee. Computer software at the subscriber station can automatically process the unique encryption identified by the PIK when it is entered for a secret transmission. Encryption software can be downloaded from the control center 2 to the subscriber station 4 for encryption updating at any time. Thus, in the system with the different unique encryptions relating to the PIK and SPIK and the absence of public directories identifying communicators, their addresses or the nature of communications, the information broadcast over the satellite system 1 is not easily decrypted by computer analysis and provides a significantly higher degree of security than prior art interactive systems.

Payments for ordered services or merchandise are authorized in the interactive purchase communications by designating a credit card, bank, or deposit account to thus afford complete interactive transactions by way of sensitive information that is maintained by this system in secrecy. The control center 2 may communicate with more than one service center in a transaction, thus for example forwarding the credit card payment or bank access code to a bank after acknowledgement of the order by the service provider. Payment then can be confirmed to the service provider for releasing information requested such as a pay-per-view program over the private link. Thus, sensitive credit card, bank, etc. data need not even be passed on to the service provider where access by an unsecured employee could result in fraud. Intrusion into the system for access to such private information is limited to those who have access to the personal identification key. Even if that is obtained, any information received would be encrypted.

In single purchase transactions, such as a local interactive purchase of a pizza giving the service station a credit card number for payment, there may be no need for any PIK encryption or secrecy other than the address directories and communication 20 portion of the control center for reformulating message. Usual interactive messages may of course be encrypted in a conventional manner, if desired.

However, when higher security is needed such as for dealings with banks or brokers, the procedure afforded by this invention significantly decreases the possibility of breach of confidential information such as bank access codes which are interactively processed over public broadcast channels.

To even further protect the identify of the interactive subscriber 4 who may make a purchase from the service station 7A, and to prevent any delivery of merchandise to an unauthorized address, the product delivery control section 40, under private communications with the control center 2 over channel 41, can match a purchased product delivered by vendor 7A via channel 42 with the purchasers address for courier type delivery. Then the service station does not require internal security controls of its personnel etc. who might be a source of customer address information that could be used as intelligence information to break the system PIK privacy.

The computer software at the control center 2 will control decryption and encryption as a function of the PIK and SPIK in use, and will relay and reformat the messages for point-to-point addressed communications within the network and protect the identify of the purchaser even if goods are delivered.

It is accordingly seen from the disclosed system and procedure that this invention provides unique and improved protection of secret messages being broadcast from the satellite system 1 to a multiplicity of subscriber stations 4 and service stations 7. Therefore those features of novelty defining the spirit and nature of the invention are set forth with particularity in the following claims.

I claim:

1. In a two-way wireless interactive video broadcast network having a plurality of interactive subscriber stations and a set of local repeater service stations at different geographic locations coupled by wireless satellite transceivers to receive and transmit interstation communications over the network, comprising in combination, message processing means at each of said stations for receiving and sending interactive communications for point-to-point transmission between stations in said network, a signal processing center for processing said interactive communications from point-to-point including means for transmitting messages to different subscriber stations in encrypted format using different personal identification keys for the different subscriber stations in the network thereby for processing private communications, encryption and decryption means at each station for processing broadcast communications addressed to that station a designated station using a said personal identification key thereby to send to and receive from the network in encrypted format private messages as a function of the personal identification key of the respective stations, and said signal processing control center having signal processing means for receiving communications sent from one station to a designated target station in encrypted format as a function of its personal identification key, converting the communications to an encrypted format as a function of the personal identification key of a designated target station, and relaying converted messages by wireless satellite station broadcast in the network.

2. A network as defined in Claim 1 further comprising: secured means for maintaining a directory of personal identification keys for the stations solely in the network at the signal processing center.

3. A network as defined in Claim 2 further comprising: a telephone line link between the stations and the signal processing center, and means for processing changes of personal identification keys in response to communications over said link.

4. A network as defined in-Claim 3 wherein the telephone line link comprises a "900" link for charging processing charges for personal identification key changes.

5. A control center for processing private communications in a network broadcasting wireless messages over a satellite transceiver station to and from a plurality of interactive subscriber stations including service provider stations, comprising in combination, means for maintaining a secured sole directory of personal identification keys for the subscriber stations in said network and for processing outgoing and incoming private communications between the subscriber stations carrying specific decryption keys to identify the source and target subscriber stations for encrypted communications sent over the network, and means for intercepting encrypted broadcast messages sent over said network in a first personal encrypted key identifying a sending station in said network and reformatting the message into a second personal encrypted key to direct encrypted messages broadcast over the network to be receivable only by a designated target station identified by said directory to have the second key.

6. A control center as defined in Claim 5 further comprising telephone links operable between said control center and said subscriber stations for communicating personal identification key assignment information privately between the stations and the control center.

7. A network as defined in Claim 5 further comprising facilities for receiving products interactively purchased from a vendor station by said private communications and for delivery to the purchaser station, said facilities being characterized by means for obtaining the purchaser's delivery address from the control center and matching the products with a purchased product without sending the purchaser's delivery address to the vendor.

8. A satellite communication network protection system for protecting privacy of broadcast network communications and the identity of their source from network subscribers, comprising in combination, a network of interconnectable subscriber stations coupled in said satellite communication network for sending and receiving communications, wherein said stations include means for transmitting the communications to other stations in the network in encrypted format with a unique personal identification key for protecting the privacy of the communications, means for identifying the encrypted format of individual stations by their unique personal identity key, means for entry of the personal identity key in communications sent from said stations, means at the individual stations for decrypting communications in the network directed thereto as a designated target station with a particular personal identification key, and central control means in the network for generally receiving and readdressing the encrypted communications between stations in the network having different unique personal identity keys, a central processing facility provided with a directory of the personal identity keys and means operable therewith for intercepting, reformatting and relaying incoming encrypted communications with personal identification key sent from said stations in an encrypted format function of the personal identity key for receipt by a designated target station into an encryption format with the personal identification key of the target station, and means for confining and maintaining a secure personal identity said directory of the keys for the stations at the central processing facility for use in reception and relay of encrypted communications point-to-point in the network to and from the stations.

9. The system of Claim 8 further comprising communication means over private connection facilities of a telephone line "900" connection for assignment of a listed personal identification key to a requesting station by the central processing facility.

10. The system of Claim 8 wherein at least one network station is a commercial station for providing goods and services to other network subscriber stations, said relayed communications are between the commercial station and one of the other stations, and said register of personal identification keys has separate registers for the commercial station keys and the other station keys.

11. The system of Claim 10 wherein the commercial station is a financial institution.

12. A two-way video wireless broadcast network coupling subscriber stations for processing private communications in encoded format between a purchaser station and a vendor station over a public TV broadcasting channel while protecting the privacy of the purchaser station and of the vendor station communications, comprising in combination, a control center coupled in the network to receive and resend encrypted communications for processing encrypted communications to purchasers and vendors in respective different encrypted codes, said control center confining the addresses and personal identification directories and related of the purchasers and vendors in privacy, and a product delivery facility for receiving purchased tangible products from the vendor and delivering them to the purchaser while protecting the identity of the purchaser from the vendor comprising a private access link from the control center to a delivery facility subscriber station for identification of the purchased product and the purchaser.

* * * * *